(12) United States Patent
Caffiau et al.

(10) Patent No.: US 10,894,341 B2
(45) Date of Patent: Jan. 19, 2021

(54) METHOD FOR PRODUCING PREFORMS WITH APPLICATION OF A BINDER TO DRY FIBER, AND CORRESPONDING MACHINE

(71) Applicant: CORIOLIS GROUP, Quéven (FR)

(72) Inventors: Johann Caffiau, Hennebont (FR); Sophie Job, Nostang (FR)

(73) Assignee: Coriolis Group, Queven (FR)

( * ) Notice: Subject to any disclaimer, the term of this patent is extended or adjusted under 35 U.S.C. 154(b) by 153 days.

(21) Appl. No.: 16/081,883

(22) PCT Filed: Mar. 7, 2017

(86) PCT No.: PCT/FR2017/000043
§ 371 (c)(1),
(2) Date: Aug. 31, 2018

(87) PCT Pub. No.: WO2017/153643
PCT Pub. Date: Sep. 14, 2017

(65) Prior Publication Data
US 2019/0118410 A1  Apr. 25, 2019

(30) Foreign Application Priority Data

Mar. 7, 2016 (FR) ..................................... 16 70088

(51) Int. Cl.
*B29B 11/16* (2006.01)
*B29C 70/38* (2006.01)
(Continued)

(52) U.S. Cl.
CPC ............ *B29B 11/16* (2013.01); *B29C 70/384* (2013.01); *B29B 15/12* (2013.01); *B29K 2101/10* (2013.01)

(58) Field of Classification Search
CPC ..... B29B 15/12; B29B 11/16; B29K 2101/10; B29C 70/384
See application file for complete search history.

(56) References Cited

U.S. PATENT DOCUMENTS

| 494,910 A | 4/1893 | Wells |
|---|---|---|
| 1,100,829 A | 6/1914 | Joseph |

(Continued)

FOREIGN PATENT DOCUMENTS

| DE | 1 922 327 U | 8/1965 |
|---|---|---|
| DE | 37 43 485 | 7/1989 |

(Continued)

OTHER PUBLICATIONS

Machine translation of FR 3016827 B1; Publication date: Jan. 2014.*

(Continued)

*Primary Examiner* — Vishal I Patel
(74) *Attorney, Agent, or Firm* — Patterson Thuente Pedersen, P.A.

(57) ABSTRACT

A method for producing preforms, by layup of fibers on a layup surface, comprising the application of a binder on at least one continuous flat dry fiber, comprising two opposite main faces, and the layup of the fiber provided with binder by means of a layup head in order to form a preform. The application of binder on a fiber is carried out by means of at least one fiberizing nozzle comprising a discharge orifice supplied with liquid or pasty binder, and one or several injection orifices supplied with pressurized gas, in such a way that said nozzle is able to deliver the binder in the form of a spiral filament, the spirals of filament being deposited on a first main face of the fiber running underneath the nozzle in order to obtain a fiber provided with filaments of binder.

10 Claims, 4 Drawing Sheets

(51) Int. Cl.
*B29B 15/12* (2006.01)
*B29K 101/10* (2006.01)

(56) References Cited

U.S. PATENT DOCUMENTS

| | | | |
|---|---|---|---|
| 1,164,303 A | 12/1915 | Nicewarner | |
| 1,301,354 A | 4/1919 | Baird | |
| 3,206,429 A | 9/1965 | Broyles et al. | |
| 3,238,084 A | 3/1966 | Hawkins | |
| 3,265,795 A | 8/1966 | Medney | |
| 3,300,355 A | 1/1967 | Adams | |
| 3,563,122 A | 2/1971 | De Neui | |
| 3,662,821 A | 5/1972 | Saxon | |
| 3,692,601 A | 9/1972 | Goldworthy et al. | |
| 3,713,572 A | 1/1973 | Goldsworthy et al. | |
| 3,856,052 A | 12/1974 | Feucht | |
| 4,118,814 A | 10/1978 | Holtom | |
| 4,234,374 A | 11/1980 | Frank | |
| 4,242,160 A | 12/1980 | Pinter et al. | |
| 4,259,144 A | 3/1981 | Ballentine | |
| 4,351,588 A | 9/1982 | Weiss et al. | |
| 4,461,669 A | 7/1984 | Dontscheff | |
| 4,488,466 A | 12/1984 | Jones | |
| 4,562,033 A | 12/1985 | Johnson et al. | |
| 4,569,716 A | 2/1986 | Pugh | |
| 4,574,029 A | 3/1986 | Murray | |
| 4,699,031 A | 10/1987 | D'Angelo et al. | |
| 4,707,212 A | 11/1987 | Hailey et al. | |
| 4,714,509 A | 12/1987 | Gruber | |
| 4,717,330 A | 1/1988 | Sarh | |
| 4,735,672 A | 4/1988 | Blad | |
| 4,849,150 A | 7/1989 | Kittaka et al. | |
| 4,881,998 A | 11/1989 | Youngkeit | |
| 4,976,012 A | 12/1990 | McConnell | |
| 4,990,213 A | 2/1991 | Brown et al. | |
| 4,992,133 A | 2/1991 | Border | |
| 4,997,513 A | 3/1991 | Lengen et al. | |
| 5,015,326 A | 5/1991 | Frank | |
| 5,078,592 A | 1/1992 | Grimshaw et al. | |
| 5,087,187 A | 2/1992 | Simkulak et al. | |
| 5,110,395 A | 5/1992 | Vaniglia | |
| 5,200,018 A | 4/1993 | Gill et al. | |
| 5,290,389 A | 3/1994 | Shupe et al. | |
| 5,397,523 A | 3/1995 | Curry | |
| 5,447,586 A | 9/1995 | Tam | |
| 5,587,041 A | 12/1996 | Sandusky et al. | |
| 5,645,677 A | 7/1997 | Cahuzac et al. | |
| 5,700,347 A * | 12/1997 | McCowin | B29C 70/545 156/425 |
| 5,766,357 A | 6/1998 | Packer et al. | |
| 5,979,531 A | 11/1999 | Barr et al. | |
| 6,026,883 A | 2/2000 | Hegerhorst et al. | |
| 6,073,670 A | 6/2000 | Koury et al. | |
| 6,096,164 A | 8/2000 | Benson et al. | |
| 6,251,185 B1 | 6/2001 | Morrison et al. | |
| 6,256,889 B1 | 7/2001 | Zuro | |
| 6,451,152 B1 | 9/2002 | Holmes et al. | |
| 6,458,309 B1 | 10/2002 | Allen et al. | |
| 6,490,990 B1 | 12/2002 | Hamlyn et al. | |
| 6,540,000 B1 | 4/2003 | Darrieux et al. | |
| 6,605,171 B1 | 8/2003 | Debalme et al. | |
| 6,808,378 B2 | 10/2004 | Wirth et al. | |
| 7,048,024 B2 | 5/2006 | Clark et al. | |
| 7,387,147 B2 | 6/2008 | Johnson et al. | |
| 7,819,160 B2 | 10/2010 | Hamlyn et al. | |
| 7,926,537 B2 | 4/2011 | Hamlyn et al. | |
| 8,052,819 B2 | 11/2011 | Munaux et al. | |
| 8,057,618 B2 | 11/2011 | Hamlyn | |
| 8,191,596 B2 | 6/2012 | Hamlyn et al. | |
| 8,667,999 B2 | 3/2014 | Hamlyn et al. | |
| 8,733,417 B2 | 5/2014 | Hamlyn et al. | |
| 9,144,945 B2 | 9/2015 | Caffiau et al. | |
| 2002/0014715 A1 | 2/2002 | Wirth et al. | |
| 2002/0090408 A1 | 7/2002 | Dahl et al. | |
| 2002/0152860 A1 | 10/2002 | Machamer | |
| 2003/0118681 A1 | 6/2003 | Dahl | |
| 2004/0031879 A1 | 2/2004 | Kay et al. | |
| 2004/0079838 A1 | 4/2004 | Simpson et al. | |
| 2004/0103948 A1 | 6/2004 | Scheelen et al. | |
| 2005/0023414 A1 | 2/2005 | Braun | |
| 2005/0037195 A1 | 2/2005 | Warek | |
| 2005/0039844 A1 | 2/2005 | Engwall et al. | |
| 2005/0061422 A1 | 3/2005 | Martin | |
| 2005/0236735 A1 | 10/2005 | Oldani et al. | |
| 2006/0127635 A1 | 6/2006 | Colson et al. | |
| 2006/0162143 A1 | 7/2006 | Nelson et al. | |
| 2006/0169118 A1 | 8/2006 | Morehead | |
| 2006/0180264 A1 | 8/2006 | Kisch et al. | |
| 2006/0231682 A1 | 10/2006 | Sarh | |
| 2007/0044919 A1 | 3/2007 | Hoffmann | |
| 2007/0044922 A1 | 3/2007 | Mischler et al. | |
| 2008/0093026 A1 | 4/2008 | Naumann | |
| 2008/0105785 A1 | 5/2008 | Griess et al. | |
| 2008/0157437 A1 | 7/2008 | Nelson et al. | |
| 2008/0196825 A1 | 8/2008 | Hamlyn | |
| 2008/0202691 A1 | 8/2008 | Hamlyn et al. | |
| 2008/0216961 A1 | 9/2008 | Hamlyn et al. | |
| 2008/0216963 A1 | 9/2008 | Hamlyn et al. | |
| 2009/0139654 A1 | 6/2009 | Wampler et al. | |
| 2009/0229760 A1 * | 9/2009 | Hamlyn | B29C 70/384 156/433 |
| 2009/0311506 A1 | 12/2009 | Herbeck et al. | |
| 2010/0252183 A1 | 10/2010 | Munaux et al. | |
| 2011/0011537 A1 | 1/2011 | Hamlyn et al. | |
| 2011/0011538 A1 | 1/2011 | Hamlyn et al. | |
| 2014/0165337 A1 | 6/2014 | De Mattia | |
| 2016/0059498 A1 | 3/2016 | Graf | |
| 2016/0114540 A1 | 4/2016 | Hamlyn et al. | |
| 2017/0246766 A1 * | 8/2017 | Dehondt | B29B 15/08 |
| 2018/0093433 A1 | 4/2018 | Treiber et al. | |
| 2018/0111341 A1 | 4/2018 | Leborgne | |
| 2019/0077094 A1 | 3/2019 | Hamlyn et al. | |

FOREIGN PATENT DOCUMENTS

| | | | |
|---|---|---|---|
| DE | 10 2007 009 124 A1 | 8/2008 | |
| DE | 10 2012 007439 A1 | 10/2013 | |
| EP | 0116137 | 8/1984 | |
| EP | 0 216 695 A1 | 4/1987 | |
| EP | 0 241 251 A1 | 10/1987 | |
| EP | 0 452 186 A1 | 10/1991 | |
| EP | 0 546 001 A1 | 6/1993 | |
| EP | 0 555 134 A1 | 8/1993 | |
| EP | 0 557 158 A1 | 8/1993 | |
| EP | 0 626 252 | 11/1994 | |
| EP | 0 695 823 A2 | 2/1996 | |
| EP | 0 697 990 | 2/1996 | |
| EP | 0 753 394 | 1/1997 | |
| EP | 0 773 099 A1 | 5/1997 | |
| EP | 1 001 066 | 5/2000 | |
| EP | 1 177 871 A2 | 2/2002 | |
| EP | 117871 A2 | 2/2002 | |
| EP | 1 342 555 A1 | 9/2003 | |
| EP | 1 757 552 A2 | 2/2007 | |
| FR | 1 590 718 | 5/1970 | |
| FR | 2 050 498 | 4/1971 | |
| FR | 2 254 428 | 7/1975 | |
| FR | 2 624 786 A1 | 6/1989 | |
| FR | 2 686 080 A1 | 7/1993 | |
| FR | 2 721 548 | 12/1995 | |
| FR | 2 784 930 A1 | 4/2000 | |
| FR | 3 006 938 A1 | 12/2004 | |
| FR | 2 865 156 | 7/2005 | |
| FR | 2 882 681 | 9/2006 | |
| FR | 2 882 681 A1 | 9/2006 | |
| FR | 2 912 953 | 8/2008 | |
| FR | 2 913 365 A1 | 9/2008 | |
| FR | 2 948 058 A1 | 1/2011 | |
| FR | 2982793 | 5/2013 | |
| FR | 3020776 A1 * | 1/2014 | B29C 70/38 |
| FR | 2 999 973 | 6/2014 | |
| FR | 3 016 827 A1 | 7/2015 | |
| FR | 3016827 A1 * | 7/2015 | B29C 70/384 |
| GB | 2 268 705 A | 1/1994 | |

(56) References Cited

FOREIGN PATENT DOCUMENTS

| | | | | |
|---|---|---|---|---|
| GB | 2 270 672 | | 3/1994 | |
| GB | 2 292 365 A | | 2/1996 | |
| JP | 01 281247 | | 11/1989 | |
| JP | 2005-007252 | | 1/2005 | |
| JP | 2005329593 | | 12/2005 | |
| WO | WO 88/10154 | A1 | 12/1988 | |
| WO | WO-8810154 | A1 * | 12/1988 | ........... B05B 7/0861 |
| WO | WO 92/04492 | A1 | 3/1992 | |
| WO | WO 95/20104 | | 7/1995 | |
| WO | WO 02/070232 | | 9/2002 | |
| WO | WO 03/035380 | A1 | 5/2003 | |
| WO | WO 2006/060270 | A1 | 6/2006 | |
| WO | WO 2006/092514 | A2 | 9/2006 | |
| WO | WO 2008/122709 | A1 | 10/2008 | |
| WO | WO 2008/132299 | A2 | 11/2008 | |
| WO | WO 2008/149004 | A1 | 12/2008 | |
| WO | WO 2015/018801 | A1 | 12/2008 | |
| WO | WO 2009/081805 | A1 | 7/2009 | |
| WO | WO 2010/049424 | A1 | 5/2010 | |
| WO | WO 2012/160270 | A1 | 11/2012 | |
| WO | WO 2013/030467 | A1 | 3/2013 | |
| WO | WO 2013/072583 | A2 | 5/2013 | |
| WO | WO 2014/202845 | A1 | 12/2014 | |
| WO | WO 2018/060559 | A1 | 4/2018 | |

OTHER PUBLICATIONS

PCT International Search Report for PCT/FR2017/000043, dated Jun. 26, 2016, 5 pgs.
English translation of PCT International Search Report for PCT/FR2017/000043, dated Jun. 26, 2016, 3 pgs.
PCT Written Opinion of the ISA for PCT/FR2017/000043, dated Jun. 26, 2016 5 pgs.
Search Report with English translation for PCT Application No. PCT/FR2014/000135, dated Oct. 8, 2014, 4 pages.
Search Report for PCT Application No. PCT/FR2009/064156, dated Feb. 1, 2010, 2 pages.
Search Report for French Application No. 1154449, dated Jan. 10, 2012, 2 pages.
Search Report for PCT Application No. PCT/FR2012/000195, dated Oct. 24, 2012, 2 pages.
Search Report for PCT Application No. PCT/FR2016/000165, dated Jan. 25, 2017, 4 pages.
English translation of Search Report for PCT Application No. PCT/FR2016/000165, dated Jan. 25, 2017, 2 pages.
Written Opinion for PCT Application No. PCT/FR2016/000165, dated Jan. 25, 2017, 6 pages.
English translation of Written Opinion for PCT Application No. PCT/FR2016/000165, dated Jan. 25, 2017, 6 pages.
Search Report for PCT Application No. PCT/FR2017/000176, dated Jan. 16, 2018, 4 pages.
English translation for Search Report for PCT Application No. PCT/FR2017/000176, dated Jan. 16, 2018, 3 pages.
Written Opinion for International Application No. PCT/FR2016/000043, dated Jul. 19, 2016, 12 pages
Search Report for PCT/FR2016/000043, dated Jul. 19, 2016, 7 pages.
Written Opinion for International Application No. PCT/FR2016/000043, dated Sep. 28, 2017, 8 pages.
Search Report dated Jul. 2, 2010 for PCT Application No. PCT/EP2010/054377, 12 pages.
French Search Report dated Apr. 13, 2010 for French Application No. 09 54963, 7 pages.
French Search Report dated Apr. 15, 2010 for French Application No. 09 54964, 8 pages.
Evans, Don O., et al. "Fiber Placement Process Study," SAMPE 34.sup.th Symposium Book of Proceedings, May 8-11, 1989, pp. 1-12.
PCT International Search Report with English translation for PCT/FR2016/000057, dated Jun. 20, 2016, 4 pgs.
Written Opinion for International Application No. PCT/FR2016/000057, dated Oct. 12, 2017, 8 pages.
Application and File History for U.S. Appl. No. 14/119,139, filed Nov. 20, 2013, inventor Caffiau et al.
Application and File history for U.S. Appl. No. 11/666,537, filed Nov. 26, 2008. Inventors: Hamlyn et al.
Application and File history for U.S. Appl. No. 11/740,064, filed Apr. 25, 2007. Inventors: Hamlyn et al.
Application and File History for U.S. Appl. No. 15/562,955, filed Sep. 29, 2017, inventor Leborgne.

* cited by examiner

METHOD FOR PRODUCING PREFORMS WITH APPLICATION OF A BINDER TO DRY FIBER, AND CORRESPONDING MACHINE

RELATED CASES

The present application is a National Phase entry of PCT Application No. PCT/FR2017/000043, filed Mar. 7, 2017, which claims priority from FR Patent Application No. 16 70088, filed Mar. 7, 2016, which applications are hereby incorporated by reference in their entireties.

TECHNICAL FIELD

This invention relates to a method for producing preforms by application of a binder on dry fibers and by layup of said fibers. This invention also relates to a method for producing composite material parts from said preforms, and a fiber layup machine for the production of such preforms.

BACKGROUND

Machines for applying or layup of fibers are known for the automatic layup on a layup tool, such as a male or female mold, of a wide strip formed from one or several fibers, in particular flat continuous fibers of the ribbon type, commonly referred to as tows, in particular fibers of carbon comprised of a multitude of threads or filaments of carbon.

These machines conventionally include a fiber application head comprising guiding means in order to guide the fiber or fibers to the layup surface. These machines furthermore comprise fiber storage means such as an offset creel, and conveying means in order to convey the fibers from the storage means to the head, and optionally a displacement system of the layup head. In the case of a strip formed of several fibers, the guiding means of the head make it possible to bring to the layup surface the fibers in the form of a strip, wherein the fibers are arranged substantially parallel edge-to-edge. For a layup in contact with the fibers, these machines, conventionally referred to as fiber placement machines, comprise a head provided with a compaction roller intended to come into contact against the layup surface in order to apply the strip, with the guiding means guiding the fibers to the roller in the form of a strip.

The fibers applied can be fibers pre-impregnated with a thermoplastic or thermosetting polymer, or dry fibers provided with a binder, in order to confer a sticky nature to the fibers during the layup.

In the case of a layup of fibers pre-impregnated with polymer, the preform, referred to as pre-impregnated, obtained after layup, is afterwards hardened or polymerized by passing in an oven in order to obtain a composite material part.

In the case of dry fibers with a binder, a polymer is injected or infused into the preform, referred to as dry, before a step of hardening. The dry preforms with binder comprise a small quantity of binder, generally less than 5% by weight, which make it possible to maintain the cohesion of the preform, while still allowing for the later impregnation thereof.

For the layup of dry fibers provided with a binder, a first technique consists in implementing fibers already covered with a binder by the supplier of raw material. Such fibers are proposed today, referred to as powdered and/or veiled, packaged in bobbins, wherein the binders have the form of powder and/or a veil on one surface or on each surface of the fibers. The binder is applied on a wide strip of fibers, the strip is then slit into several fibers calibrated to the desired width for their use in an automatic layup machine. This technique has the disadvantage of implementing an expensive product, which is difficult to use for certain applications, in particular in the field of the automobile. Moreover, during the slitting, filaments are cut on the fiber edges, which generates substantial fouling of the machines.

A second solution consists in carrying out a coating of the binder on line on a dry fiber by means of a nozzle, in particular a lip nozzle, for example on the head such as described in patent document FR2882681, or on the creel such as described in document FR3016827. In patent document FR2999973, it was proposed to apply the binder in the form of a thread on the fibers, in particular on the creel.

The purpose of this invention is to propose an alternative solution to that proposed in the prior art.

SUMMARY

To this effect, embodiments of this invention propose a method for producing preforms, by layup of fibers on a layup surface, comprising the application of a liquid or pasty binder onto at least one continuous flat dry fiber, comprising two opposite main faces, conventionally referred to as tows, preferably unidirectional, and the layup of said fiber provided with binder by means of a layup head in order to form a preform, characterized in that the application of binder on a fiber is carried out by means of at least one fiberizing nozzle comprising a discharge orifice supplied with pressurized liquid or pasty binder, and one or several injection orifices supplied with pressurized gas, for example compressed air, in such a way that the nozzle is able to deliver the binder in the form of a spiral filament, the spirals of filament being deposited on a first main face of the fiber running underneath the nozzle in order to obtain a fiber provided with filaments of binder.

According to embodiments of the invention, the binder is applied onto dry fibers by means of a fiberizing nozzle, the spirals of filament are deposited onto the main face of the fiber arranged facing the nozzle, in particular in the form of loops that are more or less regular that overlap. The method according to embodiments of the invention makes it possible to layup dry fibers with binder by using an inexpensive material. Using fiberizing nozzles allows for an application of binder that is simple and precise. The filaments of binder form a sort of veil that allows for the later infusion of the preform.

The fibers are preferably unidirectional and are formed from a multitude of threads or filaments, for example fibers from 12 to 50 K in the case of carbon, and fibers from 1200 to 9600 Tex for glass. The fibers have for example widths of one eighth of an inch, one fourth of an inch or half an inch (⅛", ¼" or ½"). In this document, the term "fibers" also designates fibers of a larger width, greater than half an inch, conventionally referred to as tapes in the technology of placement.

Different types of dry fibers can be implemented. As a non-limiting example, the dry fibers used are carbon fibers, glass fibers, aramid fibers, polyethylene fibers, and/or natural fibers, such as for example flax fibers.

The binder used can comprise one or several thermosetting polymers, for example an epoxide polymer, polyester, vinylester, phenolic, polyimide, or bismaleimide, or one or several thermoplastic polymers, for example a polyamide, thermoplastic polyester, polyethersulfone, polyetheretherketone, thermoplastic polyurethane, thermoplastic epoxide, or polyolefin. According to an embodiment the binder is a thermoplastic copolyester.

According to an embodiment, during the application of binder, the spirals of filament that are deposited on the first main face of the fiber fold at the longitudinal edges of the fiber and flatten against the second main face of the fiber, in such a way as to obtain a fiber provided with filaments of binder on each main face. Surprisingly, the inventors observed that when the spirals have a width greater than the width of the fiber, the portions of spiral that extend beyond the longitudinal edges flatten against the second face of the fiber along the two longitudinal edges. Without being bound by any theory whatsoever, the inventors suppose that the filament in spiral is sprayed by the nozzle onto the first main face and, under the effect of the spraying speed, the portions of spiral that extend beyond the edges fold along edges and flatten onto the main face opposite the nozzle. More preferably the dry fibers passing in front of the nozzle are at most ½" wide.

The method according to embodiments of the invention makes it possible as such to obtain a dry fiber provided with filaments extending over the two main faces passing through the longitudinal edges, guaranteeing a maintaining of the various filaments comprising the fiber, facilitating the layup operations and making it possible to obtain a good layup quality. The use of a dry fiber provided with a binder on its two main faces facilitates the gluing between two plies of the preform and improves in the end the cohesion of the resulting preform. Moreover, the method according to embodiments of the invention makes it possible to apply the binder on the two main faces by means of a single nozzle, and as such simplifies and limits the size of the binder application device.

According to an embodiment, during the application of binder, portions of spirals of filament coming from the two longitudinal edges of the fiber flatten against the second main face by superimposing on one another. The width of the spirals of filament is defined in such a way that they are superimposed on the second face of the fiber, as such improving the maintaining of the fiber.

According to an embodiment, after passing at the fiberizing nozzle, the fiber passes in a calibration and/or calendering system in order to calibrate the fiber in width, and/or compress the fiber in thickness, with the fiber being subjected to a pressure on each main face.

During this calendering, the filaments of binder applied on the fiber, preferably on each face, are crushed against the fiber and are bound to the filaments comprising the fiber, as such guaranteeing a good bond of the binder to the fiber. This calibration and calendering immediately after application of the binder makes it possible to obtain a calibrated dry fiber, that facilitates the conveying of the fibers to the layup head, with little fouling and provides good layup quality.

According to an embodiment, after application of the binder, the fiber is provided with filaments of binder that have a diameter between 0.02 mm and 0.10 mm, preferably between 0.04 and 0.06 mm.

According to an embodiment, after application of the binder, the fiber provided with filaments of binder comprises 2 to 10% by weight of binder, the preform obtained after layup being subjected to an operation of adding polymer.

According to an embodiment, the application of binder is carried out on line, with the method comprising the conveying of at least one dry fiber from a storage and distribution system to the layup head in order to layup the fiber on a layup surface, the application of binder on the fiber is carried out during the layup, in the storage and distribution system or during the conveying of the fiber between the storage system and the head. The layup is carried out using dry fibers and an application of binder is carried out on line, as the layup occurs, by means of one or several nozzles actuated according to the fiber speed. Preferably, the application of binder on the fiber or fibers is carried out in the storage and distribution system of the fibers, the method comprising the conveying of the fiber or fibers provided with binder to the layup head. Surprisingly, the inventors noticed that the layup of fibers provided with a binder applied on line made it possible to carry out the layup without requiring heating of the binder in the head, with the binder that has just been applied retaining a sticky nature which is sufficient to allow for the adhesion of the fiber to the layup surface and/or to one or several fibers provided with binder previously laid up on the layup surface.

According to an embodiment, the conveying is carried out by means of a flexible tube, in the inner passage where the fiber passes. Surprisingly, the inventors noticed that the fibers that have been covered with binder in the creel could be conveyed in tubes, without being deteriorated and without clogging the tubes, while still allowing for a layup without heating the binder on the head.

According to another embodiment, the fiber provided with binder is rewound into a bobbin which will then be loaded in the storage and distribution system of a layup machine in order to carry out the layup operation.

In the case of an on line application, the method comprises the layup of strips formed of one or several fibers by means of a layup head, preferably provided with an application roller in order to layup in contact with the strip against the layup surface, with the application of binder being carried out by several fiberizing nozzles, with each nozzle applying the binder independently on a single fiber, the nozzles can be supplied with binder by a common supply system, with each nozzle being actuated according to the running speed of the fiber running underneath the nozzle.

According to an embodiment, the fiber provided with binder passes in a tension limiting system immediately before the application thereof in contact on the application surface by means of an application roller, or compaction roller, so as to limit the tension of the fiber at the application roller, the tension limiting system comprises at least one cylinder on which the fiber is able to be wound partially, and driving means for driving the cylinder in rotation, the driving means being controlled by the control unit of the machine, in such a way that the peripheral speed of the cylinder is greater than the running speed of the fiber at the application roller.

The use of a tension limiting system immediately before the layup of the fiber makes it possible to limit, and even suppress, the compaction force during the layup and as such reduce the risks of displacement of the fibers previously laid up, in particular in the case of the layup of a dry preform.

According to an embodiment, the layup comprises the production of plies of fibers superimposed in different orientations, plies comprising adjacent fibers, not edge-to-edge, with a defined gap between them, in order to facilitate the later infusion of the preform, with the gaps between fibers of the plies being arranged in such a way as to form infusion channels in the thickness of the preform for the infusion. This gap between adjacent fibers can be obtained during the layup of a strip of fibers, by means of a suitable head and/or a suitable calibration and calendering system, and/or obtained between two strips of adjacent fibers, by programming this spacing in the software before layup. This spacing is for example between 0.5 and 4 mm, preferably between 1 and 3 mm.

Embodiments of the invention also have for object a method of manufacturing composite material parts, characterized in that it comprises
- the production of a preform by layup of fibers such as described hereinabove;
- a step of impregnating of polymer in the preform, the step of impregnating comprising
  in the case of a dry preform, the adding of one or several polymers by infusion or injection,
  or in the case of a preform with a quantity of binder intended to form the final matrix, the heating of the preform in order to impregnate in the entire preform the polymer or polymers forming the binder; and, optionally
- a step of hardening.

According to a first embodiment, the method according to the invention comprises the production of dry preforms, comprising the application of a binder onto dry fibers, in order to form a dry preform comprising less than 10% by weight of binder, preferably less than 5% by weight of binder, the dry preform being afterwards subjected to an operation of impregnation of a polymer in order to form a composite material part.

According to a second embodiment, the method is a method for producing preforms of the pre-impregnated type, comprising the application of a binder formed from one or several polymers in order to form a pre-impregnated preform comprising at least 30% by weight of binder, preferably at least 40% by weight of binder, with the pre-impregnated preform then being subjected to an impregnation operation, for an impregnation to the core of the binder in the fibers, then a hardening operation.

The preforms will preferably be laid up flat at high speeds, and subjected to a step of forming in order to form the preforms to their final desired shape.

This invention also has for object a fiber layup machine comprising
- a layup head comprising guiding means for guiding one or several fibers to a layup surface and preferably an application roller intended to come into contact against the layup surface,
- a storage and distribution system for storing and distributing at least one flat continuous fiber,
- conveying means for conveying the fiber or fibers from the storage and distribution system to the layup head, and
- application means for applying a binder on the dry fiber or fibers, characterized in that the application means comprise at least one fiberizing nozzle comprising a discharge orifice supplied with pressurized liquid or pasty binder and one or several injection orifices supplied with pressurized gas, in such a way that said nozzle is able to deliver the binder in the form of a spiral filament, said nozzle being controlled by a control system according to the running speed of the fiber facing the nozzle, the nozzle being arranged upstream of the layup head, preferably in the fiber storage and distribution system.

The nozzle comprises for example a chamber supplied with pressurized binder via a supply orifice and provided with a discharge orifice and with a valve mounted mobile in the chamber and actuated by actuating means between a closed position in order to close the discharge orifice and an open position in order to deliver the pressurized binder through its discharge orifice.

According to an embodiment, the machine comprises a fiber calibration and/or calendering system arranged downstream of the application means, in order to calibrate the fiber in width and/or compress the fiber in thickness.

According to an embodiment, the layup head is provided with a tension limiting system, upstream of the guiding system, able to limit the tension of the fiber or of the fibers.

The machine according to embodiments of the invention can be:
- a fiber placement machine for the application in contact of a single fiber or of a wide strip formed from several fibers, or
- a machine for application without contact, for example a filament winding machine for the application of a fiber or of a strip formed from one or several fibers.

In the case of a fiber placement machine, the head comprises an application roller for the layup in contact of fibers, the machine can furthermore include a layup head displacement system. According to an embodiment, the storage and distribution system is arranged at a distance from the layup head, for example arranged on the ground or is mounted on one of the elements of the head displacement system.

The invention shall be better understood, and other purposes, details, characteristics and advantages shall appear more clearly in the following detailed explanatory description of particular embodiments of the invention, in reference to the accompanying diagrammatical drawings.

BRIEF DESCRIPTION OF THE DRAWINGS

FIG. 1 diagrammatically shows a fiber placement machine according to the invention, allowing for the layup in contact on a mold of a strip formed from several fibers. The machine comprises a displacement system 1 which is formed here from a poly-articulated arm 11, of the six-axis poly-articulated robot type, known per se, mounted mobile on a linear rail 12 fixed to the floor. The poly-articulated arm 11 is fixed by its base 112 on a carriage 13 mounted so as to slide on the rail 12. A placement head 2 is mounted at the end wrist 11a of the poly-articulated arm. The head comprises, in a manner known per se, guiding means for guiding several fibers in the form of a strip to an application roller or compaction roller 21, with the compaction roller able to come into contact with a mold in order to apply the strip. The head further comprises cutting means in order to individually cut each fiber, and of routing means in order to reroute each fiber that has just been cut, in order to be able at any time to stop and resume the application of a fiber, as well as choose the width of the strip, and the blocking means so as to block a fiber that has just been cut. By way of example, the machine comprises a layup head such as described in patent document WO2008/132299.

Figure 1:
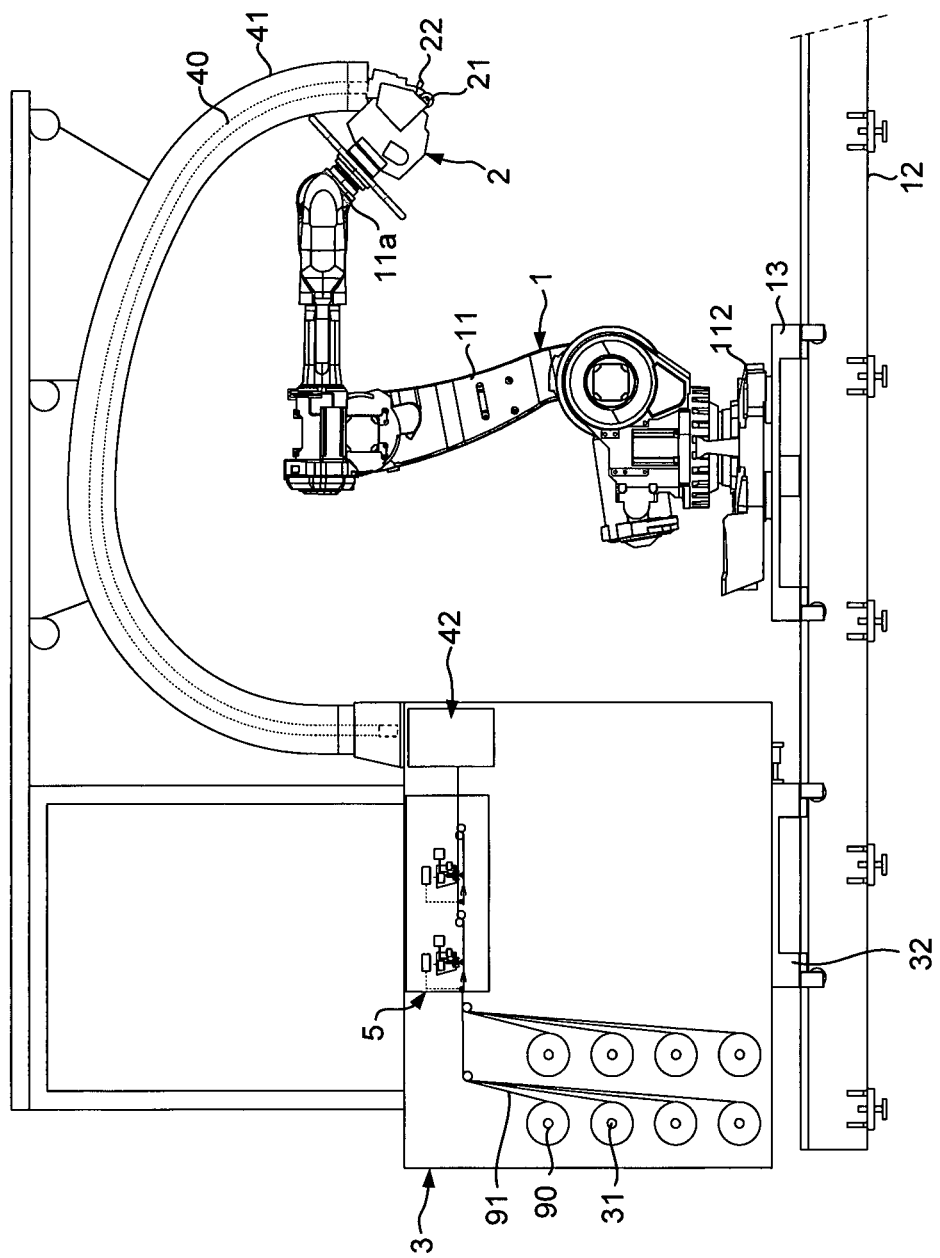
FIG. 1 is a diagrammatical side view of a fiber layup machine according to an embodiment.

The machine is provided here for the layup of flat fibers 91, also called strands, for example of the carbon fiber type or glass fibers, packaged in bobbins. The storage and distribution system comprises a creel 3, in order to receive bobbins of dry fibers, and deliver the fibers independently from one another. Each bobbin is mounted on a mandrel 31, whether or not motorised. The creel is also mounted on a follower carriage 32, arranged on the rail 12 and mechanically connected to the carriage 13 carrying the robot. In the embodiment shown, the machine is provided for the layup of a strip of eight fibers 91, with the creel comprising eight bobbins 90 of fiber.

The conveying means for conveying the fibers from the creel to the placement head are formed here from flexible tubes, such as described for example in patent document WO2012/160270. The tubes are gathered into a bundle, diagrammatically shown as reference 40, and are placed in the inner passage of a flexible sheath 41, optionally cooled in order to cool the fibers.

According to the invention, the machine is provided with binder application means 5, arranged here on the creel 3, and provided to apply via spraying a binder in liquid or pasty form onto the two main faces of each dry fiber. In reference to FIGS. 2 and 3, the application means comprise for each fiber a fiberizing nozzle 50, with the nozzle being connected to a supply system 71 that supplies several nozzles with pressurized binder.

A nozzle is arranged above each fiber 91 unwound from its bobbin. Each fiberizing nozzle 5, known per se, comprises a chamber 51 with a supply orifice 52 for the connection thereof to the supply system 71 via a supply duct 72, and a discharge orifice 53. A valve 54 is mounted mobile in the chamber and can be displaced between a closed position wherein the valve cooperates with the lower portion of the chamber, shaped as a seat, in order to close the discharge orifice, and an open position wherein the valve is at a distance from the seat in order to open the discharge orifice. This valve is controlled for opening and closing by an actuating system comprising a rod 55 that extends substantially axially in the chamber and which carries at its free end the valve 54. This rod can be maneuvered in translation by actuating means 56 in order to displace the valve between its two positions. These actuating means, for example of the electric or pneumatic type, are controlled by a control system 73, such as shown by the control line diagrammatically shown under the reference 74. The supply system 71 makes it possible to supply each nozzle with pressurized binder, at a temperature at which the binder has a viscosity that is suitable for the application thereof by means of the nozzle.

Figure 2:
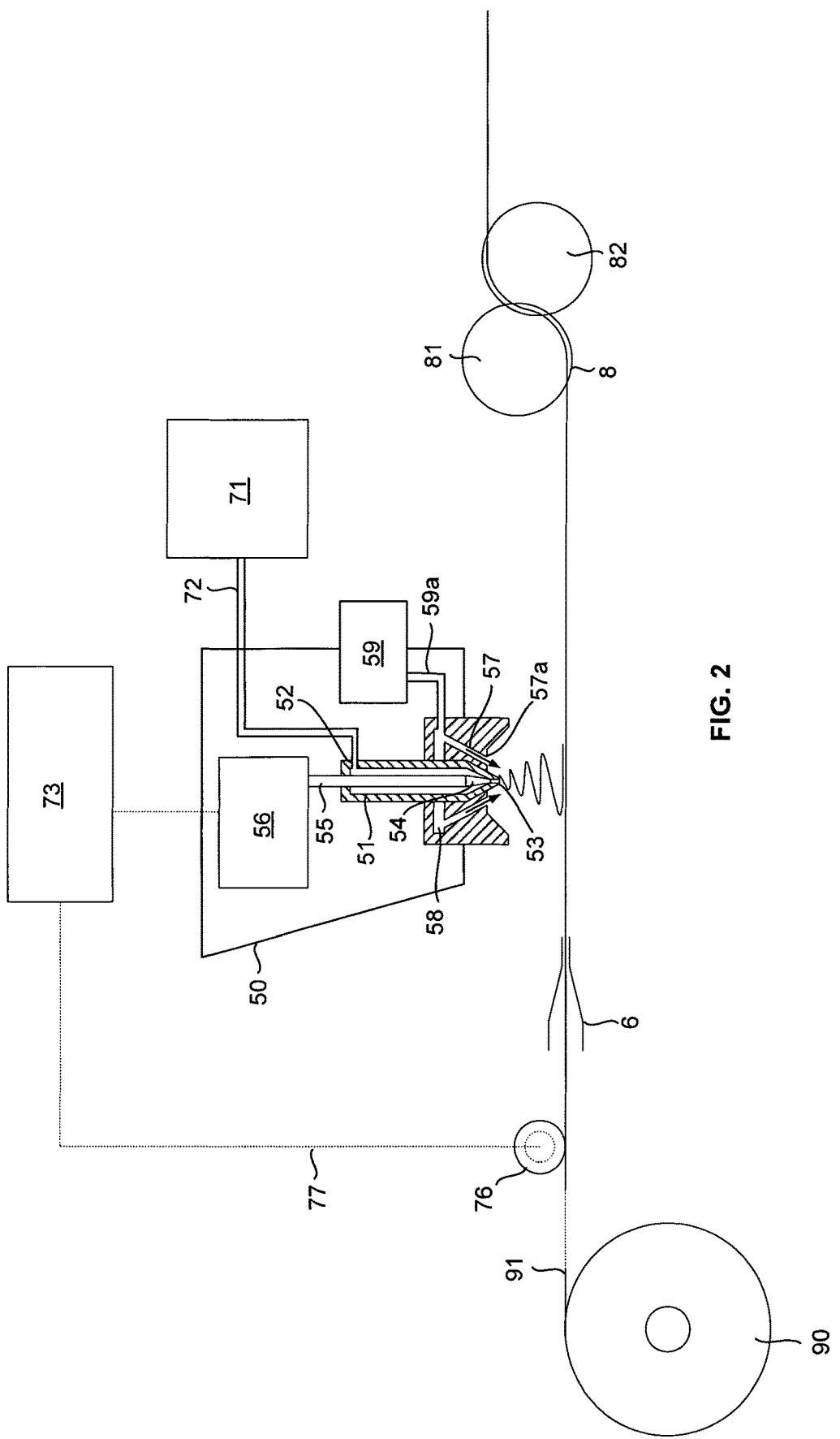
FIG. 2 is an enlarged partial diagrammatical view of the creel of the machine of FIG. 1, showing the means for applying binder on a fiber.
Figure 3:
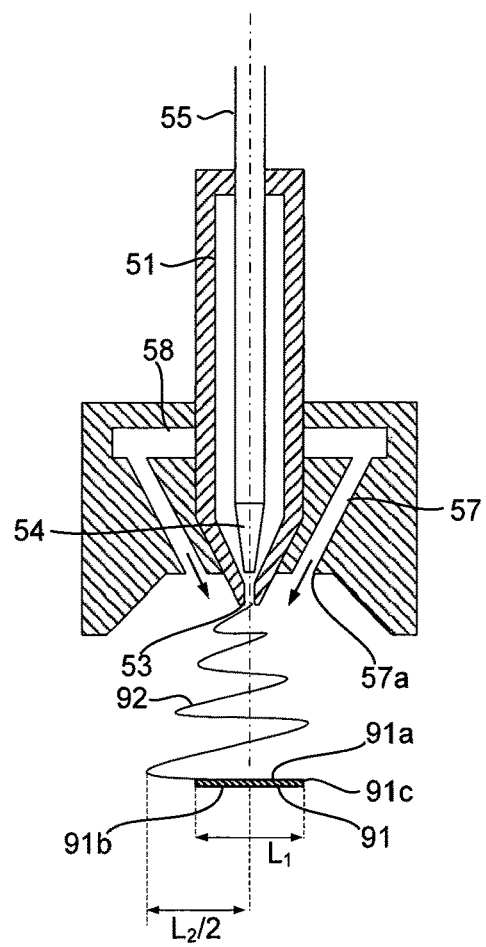
FIG. 3 is a partial diagrammatical view of the fiberizing nozzle of—FIG. 2.

The nozzle further comprises injection channels 57 supplied with compressed air in order to form air flows in the direction of the filament exiting from the discharge orifice. The injection channels have injection orifices 57a distributed at a regular angular space around the discharge orifice. The nozzle has for example eight injection channels. The injection channels open into an annular chamber 58 connected to a source of compressed air 59 by a duct 59a. The injection channels are arranged and oriented in such a way that the filament of binder exiting from the discharge orifice is driven with a circular movement and is stretched and configured in a spiral, such as shown in FIGS. 2 and 3 under the reference 92.

The nozzles apply via spraying, without contact between the nozzle and the fiber, the binder onto the fibers in the form of filaments, with the filaments coming over the two main faces of the fiber. Each nozzle is adjusted in such a way that the spirals of filament that are deposited on the first main face 91a facing the nozzle have a width D2 that is greater than the width D1 of the fiber, such as shown in FIG. 3. The spirals of filament sprayed as such onto the first main face have portions of spiral that extend beyond the longitudinal edges 91c of the fiber which fold around said edges and flatten against the second main face 91b of the fiber. This application of binder on the two faces is obtained by adjusting in particular, the air flow injected, the pressure and the temperature of the binder in the nozzle and the distance between the nozzle and the fiber.

Preferably, the portions of spirals of filament coming from a longitudinal edge are superimposed with those coming from the other longitudinal edge. The fiber is as such provided on each main face with binder in the form of filaments, with the filaments of a main face being extended on the other main face passing through the longitudinal edges. These filaments of binder applied as such make it possible to maintain the various filaments that form the fiber.

By way of example, the nozzle has a discharge orifice of about 0.3 mm in diameter. The filament exiting from the discharge orifice is stretched by the air flows coming from injection channels, in such a way that the fiber is provided on its two main faces with filaments of about 0.05 mm in diameter.

Figure 4:
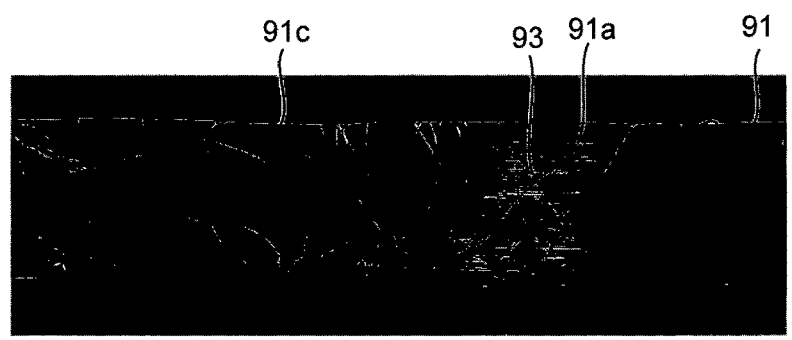
FIGS. 4 and 5 are respectively photos of a fiber provided with binder according to the invention, respectively showing the filaments of binder on the first main face facing the nozzle, and the filaments of binder overlapping on the second main face of the fiber; and, FIG. 6 is a diagrammatical view of a fiber application head according to an alternative embodiment.
Figure 5:
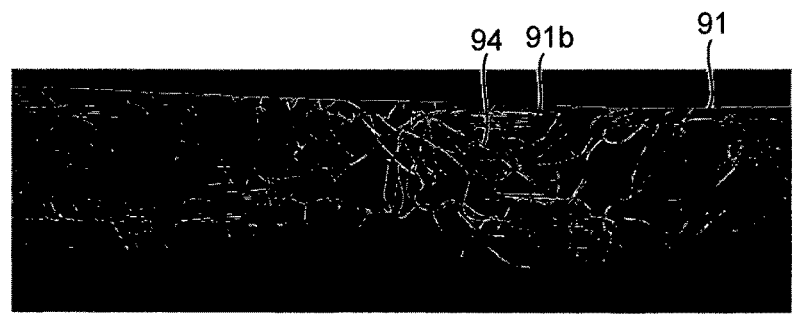

The photos in FIGS. 4 and 5 show an example of fiber obtained after application of binder according to the invention, with the photo in FIG. 4 showing the filaments 93 on the first main face of the fiber that was arranged facing the nozzle, and the photo in FIG. 5 shows the filaments 94 on the second main face of the fiber.

The control system 73 is connected to sensors for receiving information that represents the running speed of each fiber. Each fiber passes for example over a roller 76 provided with an encoder that is connected, via a line that is diagrammatically represented under the reference 77, to the control system in order to communicate the running speed of the fiber. For each fiber, the control system controls the opening and the closing of the valve of the nozzle associated with the fiber, according to the running speed of said fiber, in order to apply on line the quantity of binder desired as the fiber moves forward and as it is applied by the layup head.

Upstream of the application means, each dry fiber passes in a first calibration system 6, which makes it possible to calibrate the fibers to a desired width before the application of binder. This calibration system comprises for example for each fiber a truncated tube with a rectangular section that decreases in the downstream direction, with the width of the section of the tube at its downstream end corresponding to the desired width of fiber.

Downstream of the application means, each fiber passes in a calibration and calendering system 8 that makes it possible to calibrate the fiber in width and to compress the fiber in thickness. This system comprises for example for each fiber two calendering wheels between which pass the fiber. A first wheel 81 is provided with an annular groove with a rectangular section, of which the width corresponds to the desired width of the fiber. A second wheel 82 is provided with a rib that is inserted into the groove of the first wheel. The rib inserted into the groove forms a passage of which the section corresponds to the desired section of fiber. During the passing of the fiber between the two wheels, the filaments of binder are crushed against the filaments that form the fiber, as such providing a mechanical fastening of the filaments of binder to those of the fiber. By way of example, the filaments of binder of 0.05 mm of diameter applied by the nozzle, have after calendering a section of about 0.07 mm.

The presence of filament of binder on each main face of the fiber combined with this step of calendering makes it possible to obtain a calibrated dry fiber, which facilitates the conveying of the fiber to the head and in the head, with little fouling, and provides layup quality.

The creel can also be provided with a tension limiting system 42 (FIG. 1), such as described in patent document WO2006/092514, wherein passes the fibers at the outlet of application means, so as to limit the tension in the fiber before the entry thereof into the conveying tubes.

By way of example, the fibers placed in the creel are dry carbon fibers, comprised of a multitude of filaments of carbon and of a small quantity of sizing resin, of about 0.2% by weight. The machine is used to produce a dry preform, after application by spraying of the binder in the form of filaments onto the two main faces via the fiberizing nozzles, each fiber comprises about 5% by weight of binder. The binder comprises for example a thermoplastic copolyester. The binder can furthermore comprise one or several agents or functional fillers, in order to impart to the preform various mechanical and/or electrical properties, for example agents or fillers that improve its electrical conduction, its permeability for the infusion, its formability, and/or its resistance to impact.

A dry preform can be obtained by layup of several superimposed plies by means of the layup head, with the binder being applied on the fibers as the application of the fibers by the head occurs. As the layup is carried out with the binder freshly applied on the fibers, the binder has not fully crystalized, and retains a sticky nature. As such, it is not necessary to heat the binder at the head in order to guarantee the cohesion of the preform.

After production of a dry preform, the dry preform can be subjected to an operation of infusion or injection of an infusion or injection, thermoplastic or thermosetting polymer, then an operation of hardening in order to obtain a composite part. This operation of hardening consists in an operation referred to as consolidation in the case of thermoplastic polymer, and as a curing in the case of a thermosetting polymer.

A preform in the form of a plate with the desired dimensions can be obtained by layup of several plies. The preform can then be subjected to an operation of forming, preferably hot, with the binder applied to the fibers authorizing a deformation of the preform and the maintaining thereof in form. The preform can be placed in a forming tool that corresponds to the final form of the composite part desired in which will be carried out the operation of forming and then the operation of impregnation with polymer via injection or infusion.

According to another example, the machine is used for the production of pre-impregnated preforms comprising at least 40% by weight of binder, with the binder then forming the polymer matrix of the final part. The preform obtained after layup can then be subjected to an operation of heating and pressurizing in order to homogeneously impregnate the polymer over the entire preform, then an operation of hardening in order to obtain a composite part.

Figure 6:
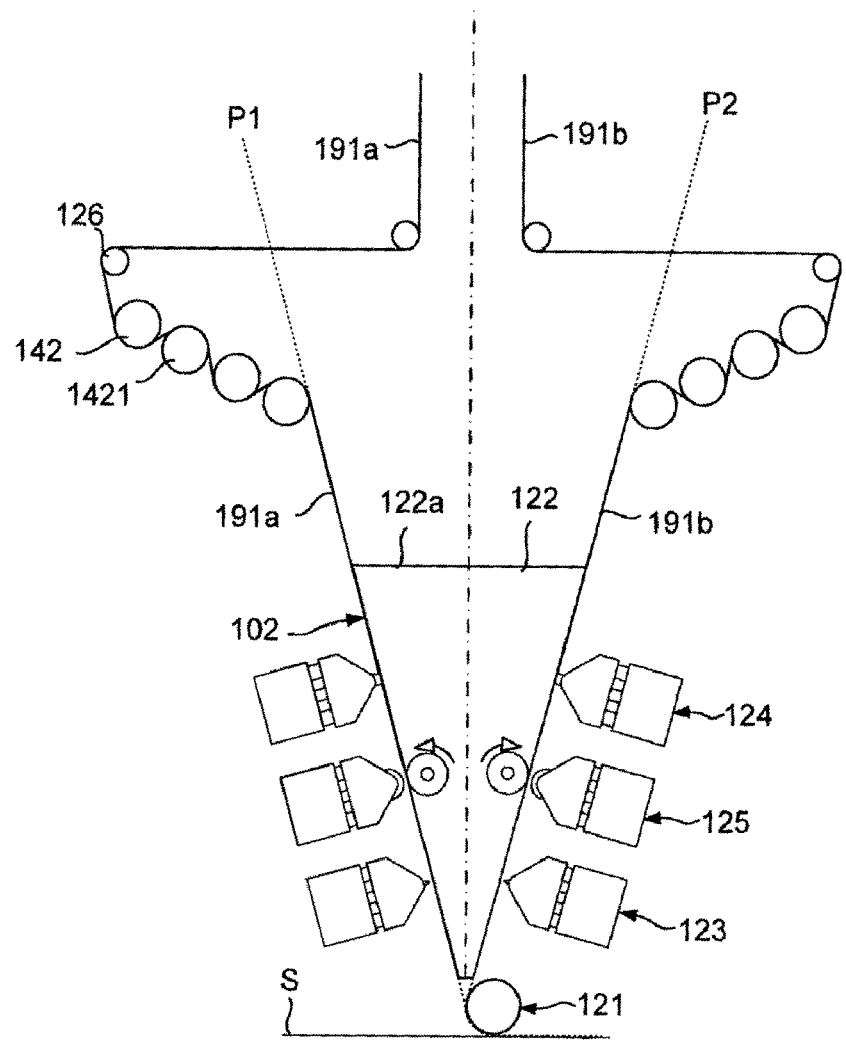

FIG. 6 shows a fiber placement head according to an alternative embodiment. The placement head 102 comprises an application roller 121, a guiding system 122 that makes it possible to guide the fibers in the direction of the roller in the form of two layers of fibers 191*a*, 191*b* arranged according to two guiding planes P1, P2, in order to form a strip of fibers wherein the fibers are arranged substantially edge-to-edge. This guiding system comprises for example guiding channels, in which pass the fibers, formed at the assembly interface of a central part 122*a*, in the shape of a wedge, and of two lateral plates (not shown). The guiding system is mounted on a support structure (not shown) through which the head is assembled to the wrist of the robot described hereinabove. Alternatively, the head is fixed and the layup surface of the mold is able to be displaced with respect to the head in order to carry out the layup operations. The head further comprises, on either side of the guiding system, cutting means 123, blocking means 124 and rerouting means 125.

The head is provided with a tension limiting system 142 arranged upstream of the guiding system 122 wherein the fibers entering into the head pass in order to limit, and even suppress the tension in the fibers applied by the roller, and as such make it possible to reduce, and even suppress the compaction force applied by the application roller. This tension limiting system is advantageously used in the case of thick preforms, comprising many plies and/or obtained from fibers that have a high titration, in particular in the case of fiberglass. The tension in the fibers at the roller is for example between 0 and 100 g, and the compaction force is between 0 and 10 N/mm, preferably between 0 and 5 N/mm.

The tension limiting system is for example of the type described in the aforementioned patent document WO2006/092514. For each fiber layer, the tension limiting system comprises one or several cylinders 1421 parallel to each other, for example in the number of four, on which the fibers of the layer are partially wound. The cylinders are driven in positive rotation by driving means. The tension limiting system is mounted on the support structure of the head. The fibers entering into the head are oriented towards the cylinders via deflecting pulleys 126. At the outlet of the cylinders, the fibers enter the guiding system 122. The driving means are controlled by the control unit of the machine, in such a way that the peripheral speeds of the cylinders are greater than the running speeds of the fibers at the application roller, in order to exert a traction force on the fibers, and as such limit the take-up tension of the fibers at the application roller to a value that is substantially constant, regardless of the running speed of the fibers. Such as described in the aforementioned document belts can be mounted around each cylinder, in such a way that a belt is inserted between each fiber and the cylinder, with each belt able to adhere to a fiber and be driven more or less by the cylinder according to the pressure exerted by the fiber on the belt, the pressure being proportional to the take-up tension on the fiber. According to another embodiment, the tension limiting system comprises for each layer, a single motorized cylinder, with or without a belt.

Although the invention has been described in connection with various particular embodiments, it is obvious that it is in no way limited by them and that it comprises all of the technical equivalents of the means described as well as the combinations thereof if the latter fall within the scope of the invention.

The invention claimed is:

1. Method for producing preforms, by layup of fibers on a layup surface, comprising
   application of a binder on at least one continuous flat dry fiber, comprising two opposite main faces and two longitudinal edges, the opposite main faces including a first main face and a second main face, and layup of said fiber provided with binder by means of a layup head in order to form a preform, wherein the application of binder on the fiber is carried out by means of at least one fiberizing nozzle comprising a discharge orifice supplied with liquid or pasty binder, and one or several injection orifices supplied with pressurized gas, in such a way that said nozzle is able to deliver the binder in the form of a spiral filament, the spirals of filament being deposited on a first main face of the fiber running underneath the nozzle in order to obtain a fiber provided with filaments of binder, and, wherein during the application of binder, the spirals of filament that are deposited on the first main face of a fiber fold at the longitudinal edges of the fiber and flatten against the second main face of the fiber, in such a way as to obtain the fiber provided with filaments of binder on each main face.

2. Method according to claim 1, wherein during the application of binder, portions of spirals of filament coming from the two longitudinal edges of the fiber flatten against the second main face by superimposing on one another.

3. Method according to claim 1, wherein the fiber, after passing at the fiberizing nozzle, passes in a calibration and/or calendering system in order to calibrate the fiber in width and/or compress the fiber in thickness.

4. Method according to claim 1, wherein after application of the binder, the fiber is provided with filaments of binder that have a diameter between 0.02 mm to 0.10 mm.

5. Method according to claim 1, wherein after application of the binder, the fiber provided with filaments of binder comprises 2 to 10% by weight of binder.

6. Method according to claim 1, wherein the application of binder is carried out on line, with the method comprising the conveying of at least one dry fiber from a storage and distribution system to the layup head in order to layup said fiber on a layup surface, the application of binder on the fiber is carried out during the layup, in the storage and distribution system or during the conveying of the fiber between the storage system and the layup head.

7. Method according to claim 6, wherein it comprises the layup of strips formed from one or several fibers by means of the layup head, with the application of binder being carried out by several fiberizing nozzles, with each nozzle applying the binder independently on a single fiber.

8. Method according to claim 6, wherein the fiber provided with binder passes in a tension limiting system immediately before the application thereof on the application surface by means of an application roller, so as to limit the tension of the fiber at the roller, said tension limiting system comprises at least one cylinder on which the fiber is able to be wound partially, and driving means for driving said cylinder in rotation, said driving means being controlled by the control unit of the machine, in such a way that the peripheral speed of the cylinder is greater than the running speed of the fiber at the application roller.

9. Method according to claim 1, wherein the layup comprises a production of plies of fibers superimposed in different orientations, plies comprising adjacent fibers, with a defined gap between them.

10. Method for manufacturing composite material parts, wherein it comprises production of a preform by layup of fibers according to claim 1;

a step of impregnating of polymer in the preform, said step of impregnating comprising adding of one or several polymers by infusion or injection, or heating of the preform in order to impregnate in the entire preform the polymer or polymers forming the binder.

* * * * *